March 25, 1924.

O. SOINÉ ET AL 1,488,074

APPARATUS FOR DISPENSING POWDEROUS MATTER

Filed Dec. 12, 1923

Inventors
Otto Soiné and Carl Petersen by
Die Patentanwälte
C. Arndt u. Dr.-Ing. Bock
durch:
Attorney Patented Mar. 25, 1924.

1,488,074

UNITED STATES PATENT OFFICE.

OTTO SOINÉ AND CARL PETERSEN, OF BRUNSWICK, GERMANY, ASSIGNORS TO AMME, GIESECKE & KONEGEN, AKTIENGESELLSCHAFT, BRAUNSCHWEIG, GERMANY, OF BRUNSWICK, GERMANY, A CORPORATION OF GERMANY.

APPARATUS FOR DISPENSING POWDEROUS MATTER.

Application filed December 12, 1923. Serial No. 680,285.

*To all whom it may concern:*

Be it known that we, OTTO SOINÉ and CARL PETERSEN, citizens of Germany, residing at Brunswick, Germany, have invented certain new and useful Improvements in Apparatus for Dispensing Powderous Matter (for which we have filed application in Germany, January 22, 1923), of which the following is a specification.

Our invention relates to improvements in apparatus for dispensing powderous matter, and more particularly in apparatus of the class in which a receptacle containing powderous matter such as chemicals or flour is provided at its bottom with suitable means such as a worm conveyer for dispensing small amounts of the said matter. The object of the improvements is to provide an apparatus in which the amount dispensed by the said means is independent of the gravity of the mass stored in the receptacle, so that by each operation a uniform mass is dispensed. With this object in view our invention consists in separating the bottom part of the receptacle from the body thereof by a member such as a partition wall supporting the mass of the powderous matter, providing means permitting the passage of matter to the bottom part, and means for returning the excess of matter from the bottom part to the body of the receptacle, so that the mass confined within the bottom part is always under the same pressure.

Figure 1:
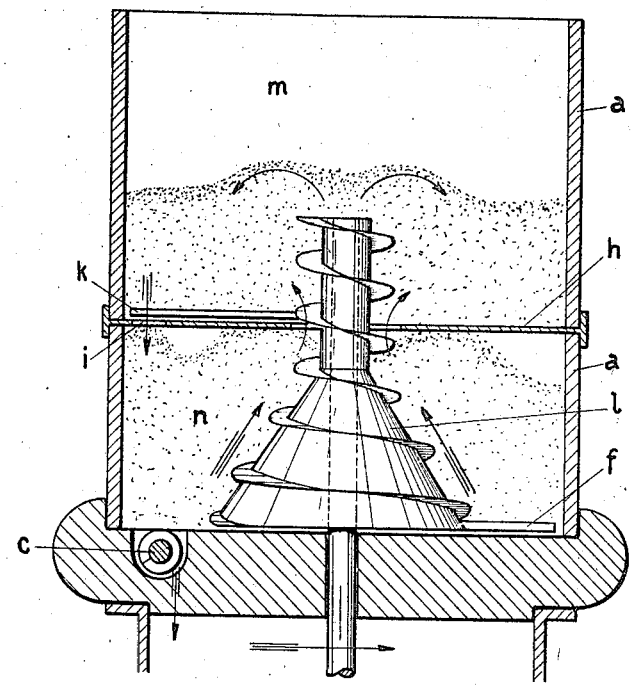
Figure 2:
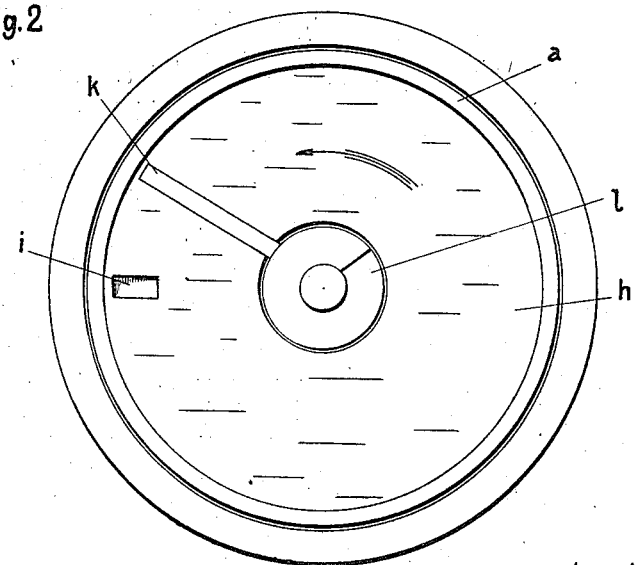

For the purpose of explaining the invention an example embodying the same has been illustrated in the accompanying drawing in which, Fig. 1, is a sectional elevation of the apparatus, and Fig. 2, is a plan view thereof.

In the example shown in the drawing a receptacle $a$ is divided by a horizontal partition wall $h$ into an upper or main chamber $m$ and a bottom chamber $n$, the upper or main chamber containing the mass of powderous matter and the bottom chamber a portion of the powderous matter. The partition $h$ is provided with one or more holes $i$ permitting the passage of the powderous matter from the chamber $m$ to the chamber $n$, a rotary arm $k$ being provided for gradually moving the matter over the bottom to the hole $i$ and stirring the matter sticking together over the hole in the manner of a vault. From the bottom chamber $n$ the material to be dispensed is taken for example by means of a rotary arm $f$ and a slowly rotating worm $c$. By the partition $h$ the matter confined within the chamber $n$ is relieved of the pressure of the mass of matter contained within the chamber $m$.

We have found that in apparatus of the construction so far described the matter discharged from the bottom chamber $n$ is not always uniformly compensated by an equal mass filled into the same, and that therefore, by reason of the varying pressure of the matter, the discharge by means of the conveyer $c$ is not always uniform. Therefore, we supply more powderous matter into the bottom chamber than is taken therefrom by means of the conveyer $c$ and we provide means for returning the excess of matter into the main chamber, said returning means being constructed so that it is operative only as long as the matter within the chamber $n$ rises above a certain level. In the example shown in the figures we provide a helical conveyer $l$ extending from the bottom chamber to the main chamber. The said conveyer has no casing but it is open at the portion extending through the top part of the bottom chamber and as shown down to the bottom. In the preferred form shown in the figure the lower part of the conveyer is in the form of a cone and the upper part is cylindrical. By means of the conveyer $l$ a part of the powderous matter is carried upwardly and returned into the chamber $m$, so that choking of the chamber $n$ and an excessive pressure are avoided. If the powderous matter does not fill out the chamber $n$ the matter falls from the upper part of the conveyer where it is not enclosed by the surrounding mass of powderous matter so that no matter is returned into the chamber $m$ until the chamber $n$ is again filled.

We claim:

1. An apparatus for storing and dispensing powderous matter, comprising a receptacle, means within said receptacle located away from the bottom thereof for supporting the powderous matter and permitting the passage of powderous matter to the bottom part of the receptacle, means to return a part of the matter from the bottom part of the receptacle to the part above the supporting means, and means for dispensing matter from the bottom part of the receptacle.

2. An apparatus for storing and dispensing powderous matter, comprising a receptacle, means within said receptacle located away from the bottom thereof for supporting the powderous matter and permitting the passage of powderous matter to the bottom part of the receptacle, a screw conveyer mounted for returning a part of the matter from the bottom part of the receptacle to the part above the supporting means and laterally open at the part below said supporting means, and means for dispensing matter from the bottom part of the receptacle.

In testimony whereof we have affixed our signatures.

OTTO SOINÉ.
CARL PETERSEN.